July 26, 1927.
E. S. JOHNSON
LEG STRUCTURE
Filed Feb. 5, 1923
1,636,912
2 Sheets-Sheet 1
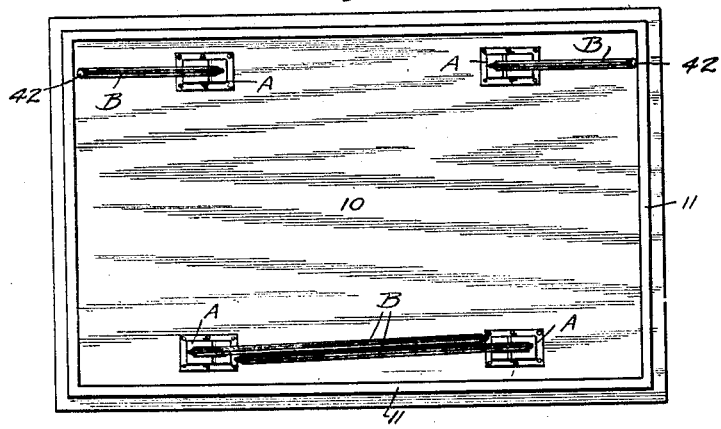
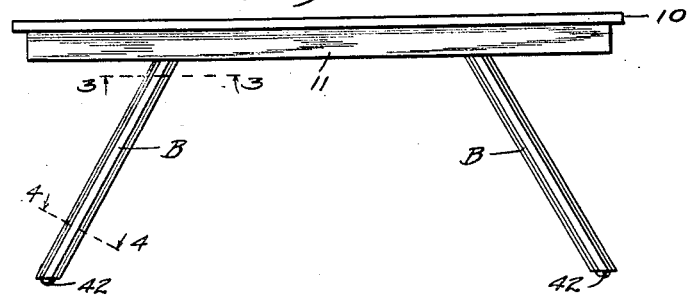
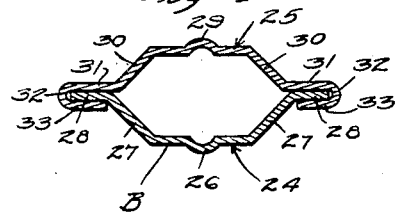
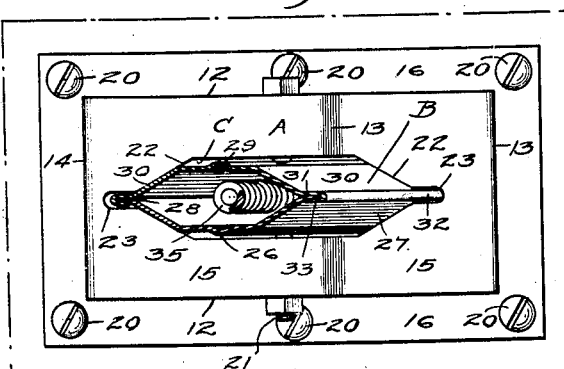
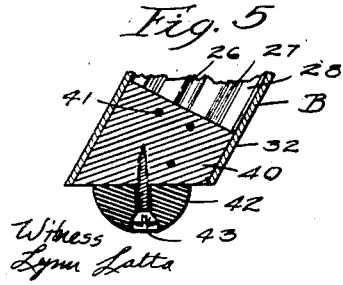
Inventor
Ernest S. Johnson
By Bair & Freeman
Attys
Witness
Lynn Latta July 26, 1927.
E. S. JOHNSON
LEG STRUCTURE
Filed Feb. 5, 1923
1,636,912
2 Sheets-Sheet 2
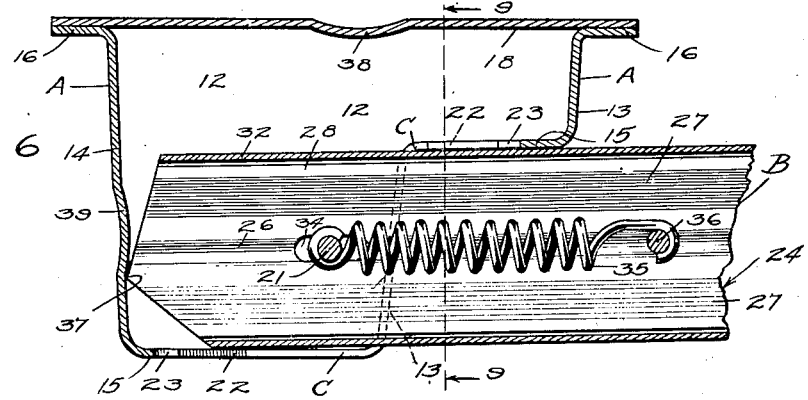
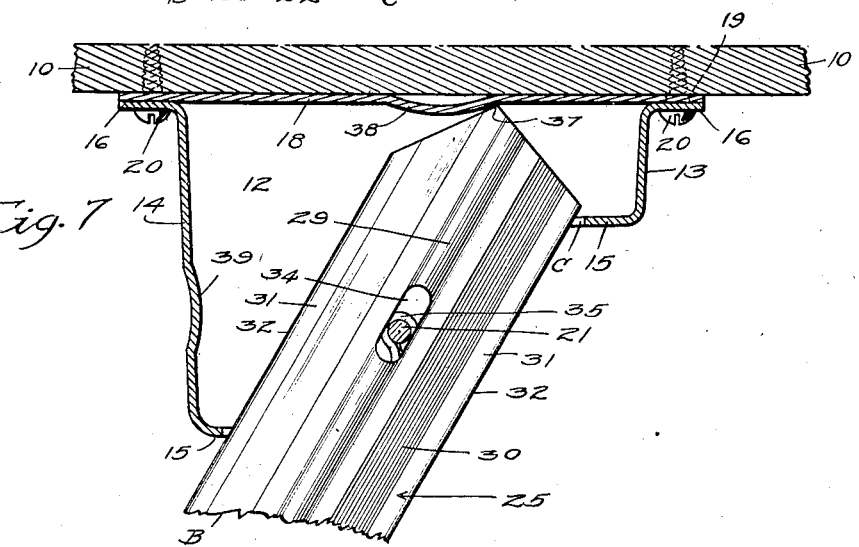
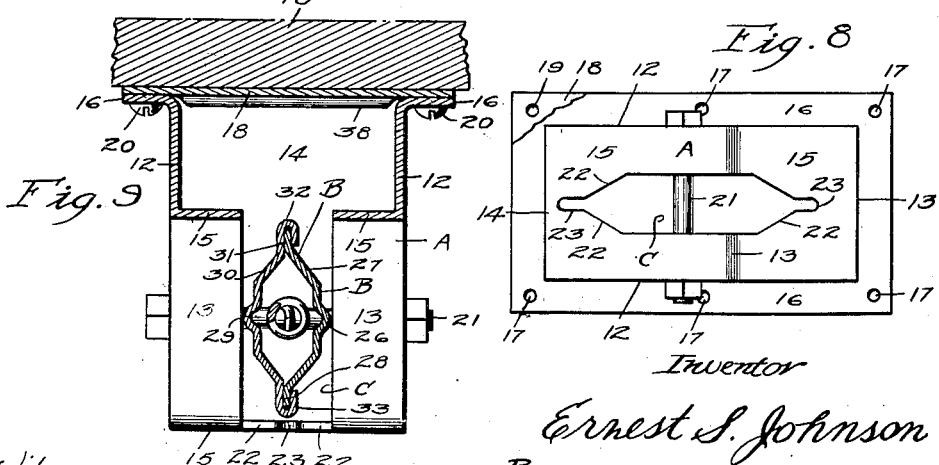
Witness
Lynn Latta
Inventor
Ernest S. Johnson
By Bair & Freeman
Att'ys Patented July 26, 1927.

1,636,912

UNITED STATES PATENT OFFICE.

ERNEST S. JOHNSON, OF WEBSTER CITY, IOWA.

LEG STRUCTURE.

Application filed February 5, 1923. Serial No. 616,944.

The object of my invention is to provide a leg structure which will be simple in its construction and operation thereby enabling it to be manufactured and marketed at a comparatively low cost and which is simple to operate.

More particularly, it is my object to provide a leg structure wherein the leg may be loosely connected to a socket member wherein it may be moved to various positions without removing or disconnecting the leg member from the socket member.

Still another object is to provide a socket member having an opening therein with the ends thereof tapered for receiving the upper end of a leg member and engaging it in such a manner that the leg member will be securely held when in operative position against any undesired movement.

Still a further object is to provide a yielding connection between the leg member and the socket member wherein the leg member may be moved to two of its positions and yieldingly held in either of its two positions.

Still a further object is to provide a pair of projections on the socket member which will engage the upper end of the leg member for tensioning the spring when the leg member is moved from one of its positions to another of its positions, whereby there will be a slight resistance to the moving of the leg member from one of its positions to another of its positions.

Still a further object is to provide a leg member which is provided with a pair of inclined sides for engaging the tapered ends of the opening in the socket wherein the parts will become firmly wedged together when in operative position and will become more firmly locked together when the load upon the leg member is increased.

Still another object is to provide a socket member having an opening in its underside with the ends thereof arranged in two different horizontal planes so that when a leg member is received in said opening, and inclined relative to the socket member, one end of the opening will engage one side of the leg member and the other end of the opening will engage the other side of the leg member.

Still a further object is to provide a socket member having an opening therein for receiving the upper end of a leg member, and to connect the leg member to the socket member in such a manner that the leg member may be moved sidewise when in its inoperative position and when in operative position there will be no side movement of the leg member.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my leg structure shown in operative position as supporting a table.

Figure 2 is a view of the underside of the table member with a pair of the legs shown in operative position and another in inoperative position.

Figure 3 is a sectional view taken on line 3—3 of Figure 1 showing one of the socket members.

Figure 4 is a detail, sectional view taken on line 4—4 of Figure 1, showing the leg construction.

Figure 5 is a detail, sectional view of one end of one of the legs.

Figure 6 is an enlarged, central, sectional view taken through the socket member and through the upper end of the leg member showing it in inoperative position.

Figure 7 is a view similar to Figure 6 with the leg member shown in operative position.

Figure 8 is a plan view of the underside of the socket member; and

Figure 9 is a sectional view through the socket member taken on line 9—9 of Figure 6.

In the accompanying drawings I have used the reference numeral 10 to indicate generally a table top or supporting element which may be provided with a downwardly extending flange 11 which is arranged near its ends and sides.

My improved leg structure includes a socket member A which is preferably formed of one sheet of metal by die stamping. The socket member A is open at its top and is provided with a pair of side walls 12 and with the end walls 13 and 14.

The side walls 12 are formed with a cutaway portion so that the bottom 15 of the socket member is arranged in two different horizontal planes and are connected together by the end wall 13.

The upper edge of the side walls 12 and the end walls 13 and 14 are provided with outturned flanges 16. The outturned flanges 16 are provided with a number of openings 17.

A plate 18 of substantially the same size as the overall dimension of the flanges 16 is provided with a number of openings 18, which are designed to register with the openings 17 in the flanges 16.

The plate 18 rests against the flanges 16 with the openings 19 and 16 in register with each other. The socket A is secured to the table or supporting element 10 by first placing the plate 18 against the underside of the element 10 and then placing the socket member A against the plate member 18.

Screws 20 project through the openings 17 and 19 and extend into the element 10, as clearly shown in Figure 7, for holding the socket member in proper position.

Mounted in the side walls 12 near the lower end thereof, is a bolt 21 which serves as a pivot member. A leg member B is arranged to cooperate with the socket member A.

The socket member A has an opening C in its bottom and in a portion of the end wall 13. The opening C is provided with tapered ends, as at 22. Instead of having the ends of the opening meet at a point, I form a U-shaped open portion 23, the purpose of which will be hereinafter more fully set forth.

The leg member B is composed of a pair of substantially similar members 24 and 25. The member 24 is formed of a flat piece of metal having a longitudinal rib 26 formed mid-way between its ends. The purpose of the rib 26 is to reinforce the member 24.

A pair of inclined walls 27 are formed from the member 24 and have outwardly extending flanges 28 on each of the free edges. The member 25 is constructed very similar to the member 24 and is provided with a reinforcing rib 29 and with the inclined walls 30. Each of the inclined walls 30 are provided with comparatively wide flanges 31 which rest against the flanges 28 of the member 24.

The flanges 31 are bent, as at 32, and are then inturned, as at 33, for extending around the flanges 28, as clearly shown in Figure 4 of the drawings.

The flanges 31 and 28 may be spot welded together for holding them against twisting or any other undesired movement.

From the construction of the parts just described, it will be seen that the members 24 and 25 form a hollow leg member which is made of comparatively light material and yet, with its particular construction and arrangement, is very strong and efficient.

The leg member B has its upper end extending through the opening C and is received within the socket member A. The leg member is provided with an elongated slot 34 in its sides. The bolt member or pivot 21 extends through the elongated slot 34 in the leg B and prevents the removal of the leg member B from the socket member.

A coil spring 35 is fixed at one end of the bolt 21 and is received within the hollow leg member B. The free end of the spring 35 is hooked over a pin 36 which has its ends fixed in the sides of the leg member B.

From the construction of the parts just described, it will be seen that the spring member 35 is completely enclosed by the leg member B.

The spring 35 tends to pull the pin member 36 towards the pivot 21 or, in other words, to draw the leg member B towards and into the socket member A.

The connecting of the leg member to the pivot 21 by means of the spring 35 gives me a loose yielding connection between the leg member B and the socket member A. The loose connection between the parts is very desirable and will be further explained hereinafter.

The upper end of the leg member B is inclined so that a point 37 is formed. The plate member 18 is provided with a projection 38. The projection 38 extends downwardly and into the socket member A. A similar projection member 39 is formed on the end wall 14 substantially midway between its top and bottom end.

The leg member, when in its inoperative position, is arranged substantially parallel with the supporting element 10, as shown in Figure 6. The point 37, on the upper end of the leg is received just below the lower portion of the projection 39. The spring 35 tends to force the point 37 against the end wall 14.

When the leg member B is swung to operative position, then it is necessary to overcome the spring tension and have the point 37 ride over the projection 39.

The fact that I have a point on the upper end of the leg member B eliminates the great amount of friction between the end wall 14 and the leg member which would otherwise be had if there was no point on the upper end of the leg member. The fact that the point 37 of the leg member B rests below the projection 39 when the leg is in inoperative position, and due to the tension of the spring 35, the leg member will remain in its inoperative position without any additional assistance.

When the leg is moved to operative position, as shown in Figure 7, then the point 37 passes over the projection 38 in the plate 18.

The inclined wall members of the leg will fit into the tapered ends of the opening C in the socket member A. The leg member B, when in operative position, is inclined from vertical and the greater the pressure upon the supporting element or table, the tighter the engagement between the leg member and the tapered ends of the opening C.

When the leg is in operative position the spring 35 tends to draw the leg upwardly so that the point 37 rests against the plate 18. When the leg is moved to inoperative position, then it is necessary to cause the point 37 thereof to move over the projection 38 and overcome the tension of the spring 35.

From the construction of the parts just described, it will be seen that the projecting portions or members 38 and 39, together with the spring 35 tends to hold the leg member in either of its two positions when they are assumed.

The portions 23 of the opening C are arranged to receive the flanges 28 and 31 of the leg member. The portions 23 in the opening C are larger than the flanges 28 and 31 so that if there is any wear on the inclined sides of the opening C which forms the tapered ends, the only thing that will happen will be to permit the leg member to move a little closer to the ends of the opening without having the flanges of the leg strike against the edges of the portions 23.

When the leg member is in its inoperative position, as shown in Figure 6, then it will project through the portion of the opening C which is formed in the end wall 13. The fact that the portion of the opening in the end wall 13 is not provided with any tapered ends, will permit the leg member to be swung sidewise.

The elongated slot 34 is comparatively large relative to the bolt or pivot 21 which permits the aforesaid sideward movement. The sideward movement permits a pair of socket members A to be secured to the underside of a table in substantial alinement. The leg members, when moved to inoperative position and swung sidewise, will permit them to rest substantially against each other, as clearly shown in Figure 2. The arrangement wherein the sideward movement is permitted is, therefore, quite advantageous.

It will further be seen that the shape of the opening is such that when the leg member is in its operative position, it will coact with the leg member and there will be no possibility of any sideward movement then.

The lower end of the leg member B has a wood plug 40 received therein and secured thereto by means of the nails or the like 41. A rubber foot piece 42 is secured to the underside of the wood plug 40 by means of a screw 43. The head of the screw 43 is recessed into the foot piece 42, as shown in Figure 5.

It will be seen that I have provided a very simple and efficient leg structure which can be secured to any suitable supporting element and can be used either as a three leg or more supporting structure.

The socket member may be secured to a supporting element at any desired point and when secured by means of the screws 20, will be complete and ready for use.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A leg structure comprising a socket having a bottom therein having parts arranged in two different planes and connected together by a portion of an end wall, said bottom parts and portion of the end wall having an elongated opening therein, the ends of the opening in the bottom parts being tapered and a leg member extended into said opening and arranged when in one position to be received in the tapered ends of the opening, said leg member comprising a pair of similar members, each having a pair of inclined walls provided on their free edges with flanges arranged to rest against each other, the flanges on one member being bent over the flanges of the other member as stated.

2. A supporting leg structure comprising a socket adapted to be secured to a supporting platform, a leg member having one end received in said socket and pivotally and slidably connected therewith, a yielding connection between the leg member and the socket including a spring mounted within the leg member, a projection on one wall of said socket for engagement with said leg when it is moved from one position to another position.

3. A supporting leg structure comprising a socket, a leg member having one end pivotally and slidably received in said socket, means for constraining said leg member when in one position toward the bottom of the socket, said means operating to constrain the leg member when in another position toward a side of the socket, a projection on said bottom and said side for engaging the end of the leg member when in either position, one of said projections operating in conjunction with said means to constrain the leg member to pivot in one direction and the other projection operating in conjunction with said means to constrain the leg member to pivot in the other direction.

4. A supporting leg structure comprising a socket, an elongated opening therein, a leg member having one end pivotally and slidably received through the opening in said socket, means for constraining said leg member when in one position toward the bottom of the socket, said means operating to constrain the leg member when in another position toward a side of the socket, a projection on said bottom and said side for engaging the end of the leg member when in either position, one of said projections operating in conjunction with said means to constrain the leg member to pivot in one direction, whereby said leg member is engaged on one side by one end of said opening and on the other side by the other end of said opening, and the other projection operating in conjunction with said means to constrain the leg member to pivot in the other direction.

5. A supporting leg structure comprising a socket, having a bottom comprised of bottom portions in two different planes and a connecting portion, an elongated slot extending the length of said connecting portion, the ends of said slot terminating in said bottom portions, a leg member having one end pivotally and slidably received through said elongated slot, means for constraining said leg member when in one position toward the bottom of the socket, said means operating to constrain the leg member when in another position toward a side of the socket, a projection on said bottom and said side for engaging the end of the leg member when in either position, one of said projections operating in conjunction with said means to constrain the leg member to pivot in one direction, whereby said leg member is engaged on one side by one end of said slot and on the other side by the other end of said slot for preventing pivotal or sideward movement, and the other projection operating in conjunction with said means to constrain the leg member to pivot in the other direction, whereby said leg engages the surface of each of said bottom portions as a stop means for the pivotal movement imparted to said leg member but permitting sideward movement.

6. A supporting leg structure comprising a socket having a bottom comprised of bottom portions in two different planes and a connecting portion, an elongated slot having its ends in said bottom portions and extending the length of said connecting portion, a leg member having one end received in said socket, means for resiliently constraining said leg pivotally in either of two directions, whereby the leg in one position will be engaged on opposite sides by the ends of said slot and in the other position will contact on opposite sides with a surface of each of said bottom portions.

ERNEST S. JOHNSON.